(12) United States Patent
Arvidson et al.

(10) Patent No.: US 7,622,405 B1
(45) Date of Patent: Nov. 24, 2009

(54) HIGH PERFORMANCE SAME FIBER COMPOSITE HYBRIDS BY VARYING RESIN CONTENT ONLY

(75) Inventors: Brian D. Arvidson, Chester, VA (US); David A. Hurst, Richmond, VA (US); Ashok Bhatnagar, Richmond, VA (US); Lori L. Wagner, Richmond, VA (US)

(73) Assignee: Honeywell International Inc., Morristown, NJ (US)

( * ) Notice: Subject to any disclaimer, the term of this patent is extended or adjusted under 35 U.S.C. 154(b) by 184 days.

(21) Appl. No.: 11/527,924

(22) Filed: Sep. 26, 2006

(51) Int. Cl.
*B32B 27/04* (2006.01)
*B32B 27/02* (2006.01)
*B32B 27/12* (2006.01)
*B32B 27/32* (2006.01)
*B32B 27/34* (2006.01)

(52) U.S. Cl. .................. 442/135; 442/134; 442/164; 442/168; 442/170; 442/179; 442/180

(58) Field of Classification Search ............... 442/134, 442/135, 164, 168, 170, 179, 180
See application file for complete search history.

(56) References Cited

U.S. PATENT DOCUMENTS

| | | | | |
|---|---|---|---|---|
| 4,737,402 A | 4/1988 | Harpell et al. | | |
| 5,179,244 A | 1/1993 | Zufle | .......... | 89/36.02 |
| 5,180,880 A | 1/1993 | Zufle | .......... | 89/36.02 |
| 5,552,208 A * | 9/1996 | Lin et al. | ..... | 428/113 |
| 5,733,643 A | 3/1998 | Green | | |
| 5,766,725 A | 6/1998 | Hogenboom et al. | | |
| 5,926,842 A | 7/1999 | Price et al. | ..... | 2/2.5 |
| 6,119,575 A | 9/2000 | Dragone et al. | ..... | 89/36.05 |
| 6,642,159 B1 | 11/2003 | Bhatnagar et al. | ..... | 442/134 |
| 6,737,368 B2 | 5/2004 | Chiou | ..... | 442/134 |
| 2003/0104738 A1 * | 6/2003 | Porter | ..... | 442/134 |

FOREIGN PATENT DOCUMENTS

| | | |
|---|---|---|
| GB | 2253589 | 9/1992 |
| GB | 2277141 | 10/1994 |
| WO | WO2005098343 | 10/2005 |

\* cited by examiner

*Primary Examiner*—Andrew T Piziali
(74) *Attorney, Agent, or Firm*—Erika S. Wilson

(57) ABSTRACT

Multi-panel ballistic resistant articles formed from woven and/or non-woven fibrous panels, each panel including varying quantities of a polymeric composition based on the total weight of the fibers and the polymeric composition. The hybrid structures provide excellent ballistic penetration resistance while maintaining a low weight. The ballistic resistant articles may be strategically positioned to dial in different levels of desired ballistic resistance for various applications.

3 Claims, No Drawings

HIGH PERFORMANCE SAME FIBER COMPOSITE HYBRIDS BY VARYING RESIN CONTENT ONLY

BACKGROUND OF THE INVENTION

1. Field of the Invention

This invention relates to multi-panel ballistic resistant articles formed from woven and/or non-woven fibrous panels, each panel includes varying quantities of a polymeric composition coating based on the total weight of the fibers and the polymeric composition.

2. Description of the Related Art

Ballistic resistant articles containing high strength fibers that have excellent properties against projectiles are well known. Articles such as bullet resistant vests, helmets, vehicle panels and structural members of military equipment are typically made from fabrics comprising high strength fibers. High strength fibers conventionally used include polyethylene fibers, aramid fibers such as poly(phenylenediamine terephthalamide), graphite fibers, nylon fibers, glass fibers and the like. For many applications, such as vests or parts of vests, the fibers may be used in a woven or knitted fabric. For other applications, the fibers may be encapsulated or embedded in a polymeric matrix material to form non-woven rigid, semi-rigid or flexible fabrics.

Various ballistic resistant constructions are known that are useful for the formation of hard or soft armor articles such as helmets, panels and vests. For example, U.S. Pat. Nos. 4,403,012, 4,457,985, 4,613,535, 4,623,574, 4,650,710, 4,737,402, 4,748,064, 5,552,208, 5,587,230, 6,642,159, 6,841,492, 6,846,758, all of which are incorporated herein by reference, describe ballistic resistant composites which include high strength fibers made from materials such as extended chain ultra-high molecular weight polyethylene. These composites display varying degrees of resistance to penetration by high speed impact from projectiles such as bullets, shells, shrapnel and the like.

For example, U.S. Pat. Nos. 4,623,574 and 4,748,064 disclose simple composite structures comprising high strength fibers embedded in an elastomeric matrix. U.S. Pat. No. 4,650,710 discloses a flexible article of manufacture comprising a plurality of flexible layers comprised of high strength, extended chain polyolefin (ECP) fibers. The fibers of the network are coated with a low modulus elastomeric material. U.S. Pat. Nos. 5,552,208 and 5,587,230 disclose an article and method for making an article comprising at least one network of high strength fibers and a matrix composition that includes a vinyl ester and diallyl phthalate. U.S. Pat. No. 6,642,159 discloses an impact resistant rigid composite having a plurality of fibrous layers which comprise a network of filaments disposed in a matrix, with elastomeric layers there between. The composite is bonded to a hard plate to increase protection against armor piercing projectiles.

Hybrid ballistic resistant structures, in and of themselves, are known. For example, U.S. Pat. Nos. 5,179,244 and 5,180,880 teach soft or hard body armor utilizing a plurality of plies made from dissimilar ballistic materials, joining aramid and non-aramid fiber plies into a combined structure and utilizing polymeric matrix materials that deteriorate when exposed to liquids. U.S. Pat. No. 5,926,842 also describes hybridized ballistic resistant structures utilizing polymeric matrix materials that deteriorate when exposed to liquids. Further, U.S. Pat. No. 6,119,575 teaches a hybrid structure containing a first section of aromatic fibers, a second section of a woven plastic and a third section of polyolefin fibers.

The present invention provides new hybrid structures that provide excellent ballistic penetration resistance while maintaining a low weight. Particularly, the invention provides articles wherein ballistic performance and article weight may be customized by manipulating the content of a polymeric matrix composition coating the fiber layers within an armor construction. The inventive construction allows the ballistic articles to be strategically positioned to dial in different levels of desired ballistic resistance for varying applications.

SUMMARY OF THE INVENTION

The invention provides a ballistic resistant material comprising, in order:

a) a first panel comprising a plurality of fibrous layers, said plurality of fibrous layers being consolidated; each of the fibrous layers comprising a plurality of fibers, said fibers having a tenacity of about 7 g/denier or more and a tensile modulus of about 150 g/denier or more; each of said fibers having a surface, and the surfaces of said fibers being coated with a polymeric composition; and b) a second panel attached to the first panel, which second panel is different than the first panel, and which second panel comprises a plurality of fibrous layers, said plurality of fibrous layers being consolidated; each of the fibrous layers comprising a plurality of fibers, said fibers having a tenacity of about 7 g/denier or more and a tensile modulus of about 150 g/denier or more; each of said fibers having a surface, and the surfaces of said fibers being coated with a polymeric composition; and c) said first panel containing a greater percentage by weight of the polymeric composition in the first panel, based on the total weight of the first panel, than a percentage by weight of the polymeric composition in said second panel, based on the total weight of the second panel.

The invention also provides a method of forming a ballistic resistant material which comprises a series of ballistic resistant panels, the method comprising:

a) providing a first panel comprising a plurality of fibrous layers, said plurality of fibrous layers being consolidated; each of the fibrous layers comprising a plurality of fibers, said fibers having a tenacity of about 7 g/denier or more and a tensile modulus of about 150 g/denier or more; each of said fibers having a surface, and the surfaces of said fibers being coated with a polymeric composition; and b) attaching at least one additional ballistic resistant panel, wherein at least one additional ballistic resistant panel is different from the first panel, to said first panel to thereby form a series of interconnected ballistic resistant panels; the at least one additional panel comprising a plurality of fibrous layers, said plurality of fibrous layers being consolidated; each of the fibrous layers comprising a plurality of fibers, said fibers having a tenacity of about 7 g/denier or more and a tensile modulus of about 150 g/denier or more; each of said fibers having a surface, and the surfaces of said fibers being coated with a polymeric composition; said first panel containing a greater percentage by weight of the polymeric composition in the first panel, based on the total weight of the first panel, than a percentage by weight of the polymeric composition in at least one additional ballistic resistant panel, based on the total weight of the at least one additional ballistic resistant panel.

The invention further provides a ballistic resistant article formed from a ballistic resistant material, the ballistic resistant material comprising:

a) a first panel comprising a plurality of fibrous layers, said plurality of fibrous layers being consolidated; each of the fibrous layers comprising a plurality of fibers, said fibers having a tenacity of about 7 g/denier or more and a tensile modulus of about 150 g/denier or more; each of said fibers having a surface, and the surfaces of said fibers being coated with a polymeric composition; and b) a second panel attached to the first panel, which second panel is different than the first panel, and which second panel comprises a plurality of fibrous layers, said plurality of fibrous layers being consolidated; each of the fibrous layers comprising a plurality of fibers, said fibers having a tenacity of about 7 g/denier or more and a tensile modulus of about 150 g/denier or more; each of said fibers having a surface, and the surfaces of said fibers being coated with a polymeric composition; and c) said first panel containing a greater percentage by weight of the polymeric composition in the first panel, based on the total weight of the first panel, than a percentage by weight of the polymeric composition in said second panel, based on the total weight of the second panel; and d) at least one additional panel attached to the first panel, to the second panel, or to both the first panel and to the second panel, the at least one additional panel comprising a plurality of fibrous layers, said plurality of fibrous layers being consolidated; each of the fibrous layers comprising a plurality of fibers, said fibers having a tenacity of about 7 g/denier or more and a tensile modulus of about 150 g/denier or more; each of said fibers having a surface, and the surfaces of said fibers optionally being coated with a polymeric composition.

DETAILED DESCRIPTION OF THE INVENTION

The invention provides a ballistic resistant material and articles that have superior ballistic penetration resistance against high energy ballistic threats, including bullets and high energy fragments, such as shrapnel. The material includes two or more individual attached panels, each panel comprising high strength fibers having a tenacity of about 7 g/denier or more and a tensile modulus of about 150 g/denier or more. Most broadly, a ballistic resistant material of the invention comprises a first panel attached to a second panel, each panel comprising a plurality of fibrous layers, said plurality of fibrous layers being consolidated; each of the fibrous layers comprising a plurality of fibers, said fibers having a tenacity of about 7 g/denier or more and a tensile modulus of about 150 g/denier or more; each of said fibers having a surface, and the surfaces of said fibers being coated with a polymeric composition. As described herein, the first panel contains a greater percentage by weight of the polymeric composition in the first panel, based on the total weight of the first panel, than a percentage by weight of the polymeric composition in said second panel, based on the total weight of the second panel. As described herein, the total weight of a panel is the weight of the fibers plus the weight of the polymeric composition that form the panel. The ballistic resistant material and articles of the invention may further include additional panels, preferably forming a series of interconnected ballistic resistant panels, wherein consecutive panels in the series contains a lower percentage by weight of the polymeric composition than the previous panel in the series to which it is connected, based on the total weight of each panel, and wherein each panel may comprise woven fibers or non-woven fibers, or a combination thereof.

For the purposes of the present invention, a "fiber" is an elongate body the length dimension of which is much greater than the transverse dimensions of width and thickness. The cross-sections of fibers for use in this invention may vary widely. They may be circular, flat or oblong in cross-section. Accordingly, the term fiber includes filaments, ribbons, strips and the like having regular or irregular cross-section. They may also be of irregular or regular multi-lobal cross-section having one or more regular or irregular lobes projecting from the linear or longitudinal axis of the fibers. It is preferred that the fibers are single lobed and have a substantially circular cross-section.

As used herein, a "yarn" is a strand consisting of multiple filaments. An "array" describes an orderly arrangement of fibers or yarns, and a "parallel array" describes an orderly parallel arrangement of fibers or yarns. A fiber "layer" describes a planar arrangement of woven or non-woven fibers or yarns. A fiber "network" denotes a plurality of interconnected fiber or yarn layers. As used herein, the term "interconnected" describes a reciprocal connection of the multiple layers or multiple panels of the invention, such that the structure functions as a single unit. A "consolidated network" describes a consolidated (merged) combination of fiber layers with a polymeric composition. As used herein, a "single layer" structure refers to monolithic structure composed of one or more individual fiber layers that have been consolidated into a single unitary structure. In general, a "fabric" may relate to either a woven or non-woven material.

The invention presents various embodiments that include two or more ballistic resistant panels, where each panel may comprise non-woven fibrous layers, woven fibrous layers, or a combination thereof. In the preferred embodiments of the invention, a panel of non-woven fibrous layers preferably comprises a single-layer, consolidated network of fibers and an elastomeric or rigid polymeric composition, which polymeric composition is also referred to in the art as a polymeric matrix composition. The terms "polymeric composition" and "polymeric matrix composition" are used interchangeably herein. More particularly, a single-layer, consolidated network of fibers comprises a plurality of fibrous layers stacked together, each fibrous layer comprising a plurality of fibers coated with the polymeric composition and unidirectionally aligned in an array so that they are substantially parallel to each other along a common fiber direction. As is conventionally known in the art, excellent ballistic resistance is achieved when individual fiber layer are cross-plied such that the fiber alignment direction of one layer is rotated at an angle with respect to the fiber alignment direction of another layer. Accordingly, successive layers of such unidirectionally aligned fibers are preferably rotated with respect to a previous layer. An example is a two layer (two ply) structure wherein adjacent layers (plies) are aligned in a 0°/90° orientation, where each individual non-woven ply is also known as a "unitape". However, adjacent layers can be aligned at virtually any angle between about 0° and about 90° with respect to the longitudinal fiber direction of another layer. For example, a five ply non-woven structure may have plies at a 0°/45°/90°/45°/0° orientation or at other angles. In the preferred embodiment of the invention, only two individual non-woven plies, cross-plied at 0° and 90°, are consolidated into a single layer network, wherein one or more of said single layer networks make up a single non-woven panel. However, it should be understood that the single-layer consolidated networks of the invention may generally include any number of cross-plied (or non-cross-plied) plies. Most typically, the single-layer consolidated networks include from 1 to about 6 plies, but may include as many as about 10 to about 20 plies as may be desired for various applications. Such rotated unidirectional alignments are described, for example, in U.S. Pat. Nos. 4,457,985; 4,748,064; 4,916,000; 4,403,012; 4,623,573; and 4,737,402. Likewise, a "panel" is a monolithic structure that may include any number of component fiber layers or plies, and typically includes 1 to about 65 fiber layers or plies, and each panel may comprise a plurality of fibrous layers which comprise non-woven fibers, a plurality of fibrous layers which comprise woven fibers, or a combination of woven fibrous layers and non-woven fibrous layers. A ballistic resistant material of the invention may also comprise at least one panel which comprises a plurality of fibrous layers which comprise non-woven fibers and at least one panel which comprises a plurality of fibrous layers which comprise woven fibers.

The stacked fibrous layers are consolidated, or united into a monolithic structure by the application of heat and pressure, to form the single-layer, consolidated network, merging the fibers and the polymeric composition of each component fibrous layer. The non-woven fiber networks can be constructed using well known methods, such as by the methods described in U.S. Pat. No. 6,642,159. The consolidated network may also comprise a plurality of yarns that are coated with such a polymeric composition, formed into a plurality of layers and consolidated into a fabric. The non-woven fiber networks may also comprise a felted structure which is formed using conventionally known techniques, comprising fibers in a random orientation embedded in a suitable polymeric composition that are matted and compressed together.

For the purposes of the present invention, the term "coated" is not intended to limit the method by which the polymeric composition is applied onto the fiber surface or surfaces. The application of the polymeric composition is conducted prior to consolidating the fiber layers, and any appropriate method of applying the polymeric composition onto the fiber surfaces may be utilized. Accordingly, the fibers of the invention may be coated on, impregnated with, embedded in, or otherwise applied with a polymeric composition by applying the composition to the fibers and then optionally consolidating the composition-fibers combination to form a composite. As stated above, by "consolidating" it is meant that the polymeric composition material and each individual fiber layer are combined into a single unitary layer. Consolidation can occur via drying, cooling, heating, pressure or a combination thereof. The term "composite" refers to consolidated combinations of fibers with the polymeric matrix composition. The term "matrix" as used herein is well known in the art, and is used to represent a polymeric binder material that binds the fibers together after consolidation.

The woven fibrous layers of the invention are also formed using techniques that are well known in the art using any fabric weave, such as plain weave, crowfoot weave, basket weave, satin weave, twill weave and the like. Plain weave is most common. Prior to weaving, the individual fibers of each woven fibrous material may or may not be coated with a polymeric composition in a similar fashion as the non-woven fibrous layers using the same polymeric compositions as the non-woven fibrous layers.

As described herein, each panel of woven or non-woven fibrous layers preferably comprises a plurality of fibrous layers, where the greater the number of layers translates into greater ballistic resistance, but also greater weight. A non-woven fibrous panel, in particular, preferably comprises two or more layers that are consolidated into a monolithic panel. A woven fibrous panel may also comprise a plurality of consolidated woven fibrous layers, which are consolidated by molding under pressure. In a preferred structure of the invention, a first panel which comprises ten consolidated layers of a woven fibrous material is attached one surface of a second panel which comprises ten non-woven fibrous layers consolidated into a single layer network, and a third panel comprising ten consolidated layers of a woven fibrous material is attached to an opposing surface of the second panel.

The number of layers forming a single panel, and the number of layers forming the non-woven composite vary depending upon the ultimate use of the desired ballistic resistant article. For example, in body armor vests for military applications, in order to form an article composite that achieves a desired 1.0 pound per square foot areal density (4.9 kg/m$^2$), a total of at 22 individual layers (or plies) may be required, wherein the plies may be woven, knitted, felted or non-woven fabrics formed from the high-strength fibers described herein, and the layers may or may not be attached together. In another embodiment, body armor vests for law enforcement use may have a number of layers based on the National Institute of Justice (NIJ) Threat Level. For example, for an NIJ Threat Level IIIA vest, there may also be a total of 22 layers. For a lower NIJ Threat Level, fewer layers may be employed.

The invention is characterized in particular by combining multiple panels that contain different quantities of a polymeric composition, as measured by the total weight of the fibers plus the polymeric composition forming the panel. Articles of the invention may include as few as two panels, wherein each panel comprises a monolithic structure, and wherein each of the two panels includes a different quantity amount of a polymeric composition. More preferably, articles of the invention include three or more monolithic panels, where each panel preferably includes a different quantity amount of a polymeric composition. It is further within the scope of the invention that each of the multiple monolithic panels of the invention may be attached by further consolidating (merging, preferably by molding) the panels to form another monolithic structure, said another monolithic structure incorporating multiple panels having differing amounts of the polymeric matrix composition, and accordingly having different sections which have different amounts of the polymeric matrix composition representing the location of each of the different panels.

In each embodiment of the invention, some panels may include identical quantities of a polymeric matrix composition. However, the total polymeric matrix composition content of at least two panels forming an article must differ. In an alternate embodiment of the invention, a ballistic resistant article comprises at least one ballistic resistant panel wherein the fibers forming the panel are not coated with a polymeric composition. If present, such an uncoated, polymeric matrix-free panel is preferably part of a series of interconnected ballistic resistant panels wherein at least one panel of the series includes a polymeric composition. Methods of attaching or interconnecting multiple panels are well known in the art, and include stitching, quilting, bolting, adhering with adhesive materials, and the like. Multiple panels may also be attached by molding under the molding conditions herein described. Preferably, said plurality of panels forming a series are interconnected by stitching together at edge areas of the panels.

In the preferred embodiments of the invention, each panel comprises a fiber content of at least about 65% by weight, more preferably at least about 70% by weight, more preferably at least about 75%, and most preferably at least about 80% by weight of the total weight of the panel. Preferably, the proportion of the polymeric composition making up each panel preferably comprises from about 1% to about 35% by weight based on the total weight of each panel composite, more preferably from about 3% to about 30% by weight, more preferably from about 5% to about 25% by weight and most preferably from about 7% to about 20% by weight of the panel, based on the total weight of the fibers and polymeric composition of each panel. These weight ranges apply to panels formed with the same polymeric composition or different polymeric compositions. Preferably, each panel has the same polymeric composition coating. Examples of preferred embodiments non-exclusively include: 1) a two-panel article wherein the first panel has a polymeric composition content of approximately 20% by weight of the combined weight of its fibers and the polymeric composition, and the second panel has a polymeric composition content of approximately 10% by weight of the combined weight of its fibers and polymeric composition; 2) a series of four interconnected panels, the panels having respective polymeric composition quantities, in order, of 20%, 15%, 10% and 7%, said panels preferably being stitched together; and 3) a three-panel article similar to the two-panel article described above, but having a matrix-free third panel attached to the 10% matrix-containing panel.

The woven or non-woven fibrous layers of the invention may be prepared using a variety of polymeric composition (polymeric matrix composition) materials, including both low modulus, elastomeric materials and high modulus, rigid materials. Suitable polymeric composition materials non-exclusively include low modulus, elastomeric materials having an initial tensile modulus less than about 6,000 psi (41.3 MPa), and high modulus, rigid materials having an initial tensile modulus at least about 300,000 psi (2068 MPa), each as measured at 37° C. by ASTM D638. As used herein throughout, the term tensile modulus means the modulus of elasticity as measured by ASTM 2256 for a fiber and by ASTM D638 for a polymeric composition material.

An elastomeric polymeric composition may comprise a variety of polymeric and non-polymeric materials. The preferred elastomeric polymeric composition comprises a low modulus elastomeric material. For the purposes of this invention, a low modulus elastomeric material has a tensile modulus, measured at about 6,000 psi (41.4 MPa) or less according to ASTM D638 testing procedures. Preferably, the tensile modulus of the elastomer is about 4,000 psi (27.6 MPa) or less, more preferably about 2400 psi (16.5 MPa) or less, more preferably 1200 psi (8.23 MPa) or less, and most preferably is about 500 psi (3.45 MPa) or less. The glass transition temperature (Tg) of the elastomer is preferably less than about 0° C., more preferably the less than about −40° C., and most preferably less than about −50° C. The elastomer also has a preferred elongation to break of at least about 50%, more preferably at least about 100% and most preferably has an elongation to break of at least about 300%.

A wide variety of materials and formulations having a low modulus may be utilized as the polymeric composition. Representative examples include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, and combinations thereof, and other low modulus polymers and copolymers curable below the melting point of the polyolefin fiber. Also preferred are blends of different elastomeric materials, or blends of elastomeric materials with one or more thermoplastics. The polymeric composition may also include fillers such as carbon black or silica, may be extended with oils, or may be vulcanized by sulfur, peroxide, metal oxide or radiation cure systems as is well known in the art.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R-(BA)_x$ (x=3-150); wherein A is a block from a polyvinyl aromatic monomer and B is a block from a conjugated diene elastomer. Many of these polymers are produced commercially by Kraton Polymers of Houston, Tex. and described in the bulletin "Kraton Thermoplastic Rubber", SC-68-81. The most preferred polymeric composition polymer comprises styrenic block copolymers sold under the trademark Kraton® commercially produced by Kraton Polymers. The most preferred low modulus polymeric matrix composition comprises a polystyrene-polyisoprene-polystyrene-block copolymer.

Preferred high modulus, rigid polymeric composition materials useful herein include materials such as a vinyl ester polymer or a styrene-butadiene block copolymer, and also mixtures of polymers such as vinyl ester and diallyl phthalate or phenol formaldehyde and polyvinyl butyral. A particularly preferred rigid polymeric composition material for use in this invention is a thermosetting polymer, preferably soluble in carbon-carbon saturated solvents such as methyl ethyl ketone, and possessing a high tensile modulus when cured of at least about $1 \times 10^6$ psi (6895 MPa) as measured by ASTM D638. Particularly preferred rigid polymeric composition materials are those described in U.S. Pat. No. 6,642,159, which is incorporated herein by reference.

In addition to the non-woven fibrous layers, the woven fibrous layers are also preferably coated with the polymeric composition. Preferably the fibers comprising the woven fibrous layers are at least partially coated with a polymeric composition, followed by a consolidation step similar to that conducted with non-woven fibrous layers. However, coating the woven fibrous layers with a polymeric composition is not required. For example, a plurality of woven fibrous layers forming a panel of the invention do not necessarily have to be consolidated, and may be attached by other means, such as with a conventional adhesive, or by stitching. Generally, a polymeric composition coating is necessary to efficiently merge, i.e. consolidate, a plurality of fibrous layers. In the preferred embodiment of the invention, a matrix-free panel, if included, preferably comprises one or more woven fibrous layers that are not coated with a polymeric composition, wherein multiple woven layers may be joined by stitching or any other common method.

The rigidity, impact and ballistic properties of the articles formed from the fabric composites of the invention are affected by the tensile modulus of the polymeric composition polymer. For example, U.S. Pat. No. 4,623,574 discloses that fiber reinforced composites constructed with elastomeric matrices having tensile moduli less than about 6000 psi (41, 300 kPa) have superior ballistic properties compared both to composites constructed with higher modulus polymers, and also compared to the same fiber structure without a polymeric matrix composition. However, low tensile modulus polymeric matrix composition polymers also yield lower rigidity composites. Further, in certain applications, particularly those where a composite must function in both anti-ballistic and structural modes, there is needed a superior combination of ballistic resistance and rigidity. Accordingly, the most appropriate type of polymeric composition polymer to be used will vary depending on the type of article to be formed from the fabrics of the invention. In order to achieve a compromise in both properties, a suitable polymeric composition may combine both low modulus and high modulus materials to form a single polymeric composition.

The remaining portion of the composite is preferably composed of fibers. In accordance with the invention, the fibers comprising each of the woven and non-woven fibrous layers preferably comprise high-strength, high tensile modulus fibers. As used herein, a "high-strength, high tensile modulus fiber" is one which has a preferred tenacity of at least about 7 g/denier or more, a preferred tensile modulus of at least about 150 g/denier or more, and preferably an energy-to-break of at least about 8 J/g or more, each both as measured by ASTM D2256. As used herein, the term "denier" refers to the unit of linear density, equal to the mass in grams per 9000 meters of fiber or yarn. As used herein, the term "tenacity" refers to the tensile stress expressed as force (grams) per unit linear density (denier) of an unstressed specimen. The "initial modulus" of a fiber is the property of a material representative of its resistance to deformation. The term "tensile modulus" refers to the ratio of the change in tenacity, expressed in grams-force per denier (g/d) to the change in strain, expressed as a fraction of the original fiber length (in/in).

Particularly suitable high-strength, high tensile modulus fiber materials include polyolefin fibers, particularly extended chain polyolefin fibers, such as highly oriented, high molecular weight polyethylene fibers, particularly ultra-high molecular weight polyethylene fibers and ultra-high molecular weight polypropylene fibers. Also suitable are aramid fibers, particularly para-aramid fibers, polyamide fibers, polyethylene terephthalate fibers, polyethylene naphthalate fibers, extended chain polyvinyl alcohol fibers, extended chain polyacrylonitrile fibers, polybenzazole fibers, such as polybenzoxazole (PBO) and polybenzothiazole (PBT) fibers, and liquid crystal copolyester fibers. Each of these fiber types is conventionally known in the art.

In the case of polyethylene, preferred fibers are extended chain polyethylenes having molecular weights of at least 500,000, preferably at least one million and more preferably between two million and five million. Such extended chain polyethylene (ECPE) fibers may be grown in solution spinning processes such as described in U.S. Pat. No. 4,137,394 or 4,356,138, which are incorporated herein by reference, or may be spun from a solution to form a gel structure, such as described in U.S. Pat. Nos. 4,551,296 and 5,006,390, which are also incorporated herein by reference. A particularly preferred fiber type for use in the invention are polyethylene fibers sold under the trademark SPECTRA® from Honeywell International Inc. SPECTRA® fibers are well known in the art and are described, for example, in U.S. Pat. Nos. 4,623,547 and 4,748,064.

Also particularly preferred are aramid (aromatic polyamide) or para-aramid fibers. Such are commercially available and are described, for example, in U.S. Pat. No. 3,671,542. For example, useful poly(p-phenylene terephthalamide) filaments are produced commercially by Dupont corporation under the trade name of KEVLAR®. Also useful in the practice of this invention are poly(m-phenylene isophthalamide) fibers produced commercially by Dupont under the trade name NOMEX® and fibers produced commercially by Teijin under the trade name TWARON®.

Suitable polybenzazole fibers for the practice of this invention are commercially available and are disclosed for example in U.S. Pat. Nos. 5,286,833, 5,296,185, 5,356,584, 5,534,205 and 6,040,050, each of which are incorporated herein by reference. Preferred polybenzazole fibers are ZYLON® brand fibers from Toyobo Co. Suitable liquid crystal copolyester fibers for the practice of this invention are commercially available and are disclosed, for example, in U.S. Pat. Nos. 3,975,487; 4,118,372 and 4,161,470, each of which is incorporated herein by reference.

Suitable polypropylene fibers include highly oriented extended chain polypropylene (ECPP) fibers as described in U.S. Pat. No. 4,413,110, which is incorporated herein by reference. Suitable polyvinyl alcohol (PV-OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and are widely commercially available.

The other suitable fiber types for use in the present invention include glass fibers, fibers formed from carbon, fibers formed from basalt or other minerals, rigid rod fibers such as M5® fibers, and combinations of all the above materials, all of which are commercially available. For example, the fibrous layers may be formed from a combination of SPECTRA® fibers and Kevlar® fibers. M5® fibers are manufactured by Magellan Systems International of Richmond, Va. and are described, for example, in U.S. Pat. Nos. 5,674,969, 5,939,553, 5,945,537, and 6,040,478, each of which is incorporated herein by reference. Specifically preferred fibers include M5® fibers, polyethylene SPECTRA® fibers, and aramid Kevlar® fibers. The fibers may be of any suitable denier, such as, for example, 50 to about 3000 denier, more preferably from about 200 to 3000 denier, still more preferably from about 650 to about 2000 denier, and most preferably from about 800 to about 1500 denier.

The most preferred fibers for the purposes of the invention are either high-strength, high tensile modulus extended chain polyethylene fibers or high-strength, high tensile modulus para-aramid fibers. As stated above, a high-strength, high tensile modulus fiber is one which has a preferred tenacity of about 7 g/denier or more, a preferred tensile modulus of about 150 g/denier or more and a preferred energy-to-break of about 8 J/g or more, each as measured by ASTM D2256. In the preferred embodiment of the invention, the tenacity of the fibers should be about 15 g/denier or more, preferably about 20 g/denier or more, more preferably about 25 g/denier or more and most preferably about 30 g/denier or more. The fibers of the invention also have a preferred tensile modulus of about 300 g/denier or more, more preferably about 400 g/denier or more, more preferably about 500 g/denier or more, more preferably about 1,000 g/denier or more and most preferably about 1,500 g/denier or more. The fibers of the invention also have a preferred energy-to-break of about 15 J/g or more, more preferably about 25 J/g or more, more preferably about 30 J/g or more and most preferably have an energy-to-break of about 40 J/g or more.

These combined high strength properties are obtainable by employing well known processes. U.S. Pat. Nos. 4,413,110, 4,440,711, 4,535,027, 4,457,985, 4,623,547 4,650,710 and 4,748,064 generally discuss the formation of preferred high strength, extended chain polyethylene fibers employed in the present invention. Such methods, including solution grown or gel fiber processes, are well known in the art. Methods of forming each of the other preferred fiber types, including para-aramid fibers, are also conventionally known in the art, and the fibers are commercially available.

As discussed above, the polymeric composition (matrix) may be applied to a fiber in a variety of ways, and the term "coated" is not intended to limit the method by which the polymeric composition is applied onto the fiber surface or surfaces. For example, the polymeric composition may be applied in solution form by spraying or roll coating a solution of the polymeric composition onto fiber surfaces, wherein a portion of the solution comprises the desired polymer or polymers and a portion of the solution comprises a solvent capable of dissolving the polymer or polymers, followed by drying. Another method is to apply a neat polymer of the coating material to fibers either as a liquid, a sticky solid or particles in suspension or as a fluidized bed. Alternatively, the coating may be applied as a solution or emulsion in a suitable solvent which does not adversely affect the properties of the fiber at the temperature of application. For example, the fiber can be transported through a solution of the polymeric composition to substantially coat the fiber and then dried to form a coated fiber. The resulting coated fiber can then be arranged into the desired network configuration. In another coating technique, a layer of fibers may first be arranged, followed by dipping the layer into a bath of a solution containing the polymeric composition dissolved in a suitable solvent, such that each individual fiber is substantially coated with the polymeric composition, and then dried through evaporation of the solvent. The dipping procedure may be repeated several times as required to place a desired amount of polymeric composition coating on the fibers, preferably encapsulating each of the individual fibers or covering 100% of the fiber surface area with the polymeric composition.

While any liquid capable of dissolving or dispersing a polymer may be used, preferred groups of solvents include water, paraffin oils and aromatic solvents or hydrocarbon solvents, with illustrative specific solvents including paraffin oil, xylene, toluene, octane, cyclohexane, methyl ethyl ketone (MEK) and acetone. The techniques used to dissolve or disperse the coating polymers in the solvents will be those conventionally used for the coating of similar materials on a variety of substrates.

Other techniques for applying the coating to the fibers may be used, including coating of the high modulus precursor (gel fiber) before the fibers are subjected to a high temperature stretching operation, either before or after removal of the solvent from the fiber (if using the gel-spinning fiber forming technique). The fiber may then be stretched at elevated temperatures to produce the coated fibers. The gel fiber may be passed through a solution of the appropriate coating polymer under conditions to attain the desired coating. Crystallization of the high molecular weight polymer in the gel fiber may or may not have taken place before the fiber passes into the solution. Alternatively, the fiber may be extruded into a fluidized bed of an appropriate polymeric powder. Furthermore, if a stretching operation or other manipulative process, e.g. solvent exchanging, drying or the like is conducted, the coating may be applied to a precursor material of the final fiber. In the most preferred embodiment of the invention, the fibers of the invention are first coated with the polymeric composition, followed by arranging a plurality of fibers into either a woven or non-woven fiber layer. Such techniques are well known in the art.

Each panel described herein has outer surfaces. In a preferred embodiment of the invention, at least one polymer film is attached to at least one outer surface of at least one panel. A polymer film may be desired to decrease friction between panels, because some panel types have sticky or rubbery surfaces. Suitable polymers for said polymer film non-exclusively include thermoplastic and thermosetting polymers. Suitable thermoplastic polymers non-exclusively may be selected from the group consisting of polyolefins, polyamides, polyesters, polyurethanes, vinyl polymers, fluoropolymers and co-polymers and mixtures thereof. Of these, polyolefin layers are preferred. The preferred polyolefin is a polyethylene. Non-limiting examples of polyethylene films are low density polyethylene (LDPE), linear low density polyethylene (LLDPE), linear medium density polyethylene (LMDPE), linear very-low density polyethylene (VLDPE), linear ultra-low density polyethylene (ULDPE), high density polyethylene (HDPE). Of these, the most preferred polyethylene is LLDPE. Suitable thermosetting polymers non-exclusively include thermoset allyls, aminos, cyanates, epoxies, phenolics, unsaturated polyesters, bismaleimides, rigid polyurethanes, silicones, vinyl esters and their copolymers and blends, such as those described in U.S. Pat. Nos. 6,846,758, 6,841,492 and 6,642,159. As described herein, a polymer film includes polymer coatings.

Such optional polymer films may be attached to one or both of the outer surfaces of a panel using well known lamination techniques. Typically, laminating is done by positioning the individual layers on one another under conditions of sufficient heat and pressure to cause the layers to combine into a unitary film. The individual layers are positioned on one another, and the combination is then typically passed through the nip of a pair of heated laminating rollers by techniques well known in the art. Lamination heating may be done at temperatures ranging from about 95° C. to about 175° C., preferably from about 105° C. to about 175° C., at pressures ranging from about 5 psig (0.034 MPa) to about 100 psig (0.69 MPa), for from about 5 seconds to about 36 hours, preferably from about 30 seconds to about 24 hours. Alternately, a polymeric film may be attached to a panel during a molding step described below. In the preferred embodiment of the invention, optional polymer film layers would comprise from about 2% to about 25% by weight based on the combined weight of the fibers, polymeric composition and polymer films, more preferably from about 2% to about 17% percent by weight and most preferably from 2% to 12% by weight. The percent by weight of the polymer film layers will generally vary depending on the number of fabric layers forming a panel.

In forming the panels of the invention, multiple fibrous layers are preferably molded under heat and pressure in a suitable molding apparatus. Generally, the panels are molded at a pressure of from about 50 psi (344.7 kPa) to about 5000 psi (34470 kPa), more preferably about 100 psi (689.5 kPa) to about 1500 psi (10340 kPa), most preferably from about 150 psi (1034 kPa) to about 1000 psi (6895 kPa). The fibrous layers may alternately be molded at higher pressures of from about 500 psi (3447 kPa) to about 5000 psi, more preferably from about 750 psi (5171 kPa) to about 5000 psi and more preferably from about 1000 psi to about 5000 psi. The molding step may take from about 4 seconds to about 45 minutes. Preferred molding temperatures range from about 200° F. (~93° C.) to about 350° F. (~177° C.), more preferably at a temperature from about 200° F. to about 300° F. (~149° C.) and most preferably at a temperature from about 200° F. to about 280° F. (~121° C.). Suitable molding temperatures, pressures and times will generally vary depending on the type of polymeric composition type, polymeric composition content, and type of fiber. The pressure under which the fabrics of the invention are molded has a direct effect on the stiffness or flexibility of the resulting molded product. Particularly, the higher the pressure at which the fabrics are molded, the higher the stiffness, and vice-versa. In addition to the molding pressure, the quantity, thickness and composition of the fabric layers, polymeric composition type and optional polymer film also directly affects the stiffness of the articles formed from the inventive fabrics.

While each of the molding and consolidation techniques described herein may appear similar, each process is different. Particularly, molding is a batch process and consolidation is a continuous process. Further, molding typically involves the use of a mold, such as a shaped mold or a match-die mold when forming a flat panel.

If a separate consolidation step is conducted to form one or more single layer, consolidated networks prior to molding, the consolidation may be conducted in an autoclave, as is conventionally known in the art. When heating, it is possible that the polymeric composition can be caused to stick or flow without completely melting. However, generally, if the polymeric composition material is caused to melt, relatively little pressure is required to form the composite, while if the polymeric composition material is only heated to a sticking point, more pressure is typically required. The consolidation step may generally take from about 10 seconds to about 24 hours. Similar to molding, suitable consolidation temperatures, pressures and times are generally dependent on the type of polymer, polymer content, process used and type of fiber.

The panels or fabrics of the invention may optionally be calendared under heat and pressure to smooth or polish their surfaces. Calendaring methods are well known in the art and may be conducted prior to or after molding.

The multiple panels of the invention may be adjoined in a bonded array or may be juxtaposed in a non-bonded array. Methods of bonding are well known in the art, and include stitching, quilting, bolting, adhering with adhesive materials, and the like. Preferably, said plurality of layers are attached by stitching together at edge areas of the layers.

The thickness of the individual fabric layers and panels will correspond to the thickness of the individual fibers. Accordingly, a preferred woven fibrous layer will have a preferred thickness of from about 25 μm to about 500 μm, more preferably from about 75 μm to about 385 μm and most preferably from about 125 μm to about 255 μm. A preferred single-layer, consolidated network will have a preferred thickness of from about 12 μm to about 500 μm, more preferably from about 75 μm to about 385 μm and most preferably from about 125 μm to about 255 μm. A polymer film is preferably very thin, having preferred thicknesses of from about 1 μm to about 250 μm, more preferably from about 5 μm to about 25 μm and most preferably from about 5 μm to about 9 μm. A ballistic resistant article, including a series of interconnected ballistic resistant panels and any optional polymer films, has a preferred total thickness of about 5 μm to about 1000 μm, more preferably from about 6 μm to about 750 μm and most preferably from about 7 μm to about 500 μm. While such thicknesses are preferred, it is to be understood that other film thicknesses may be produced to satisfy a particular need and yet fall within the scope of the present invention. The multi-panel articles of the invention further have a preferred areal density of from about 0.25 lb/ft$^2$ (psf) (1.22 kg/m$^2$ (ksm)) to about 2.0 psf (9.76 ksm), more preferably from about 0.5 psf (2.44 ksm) to about 1.5 psf (7.32 ksm), more preferably from about 0.7 psf (3.41 ksm) to about 1.5 psf (7.32 ksm), and most preferably from about 0.75 psf (3.66 ksm) to about 1.25 psf (6.1 ksm).

In another embodiment, at least one rigid plate may be attached to a ballistic resistant article of the invention to increase protection against armor piercing projectiles. In ballistic resistant vest applications, articles including a rigid plate are commonly desirable. Such a rigid plate may comprise a ceramic, a glass, a metal-filled composite, a ceramic-filled composite, a glass-filled composite, a cermet, high hardness steel (HHS), armor aluminum alloy, titanium or a combination thereof, wherein the rigid plate and the inventive panels are stacked together in face-to-face relationship. Preferably only one rigid plate is attached to the top surface of a series of panels, rather than to each individual panel of a series. The three most preferred types of ceramics include aluminum oxide, silicon carbide and boron carbide.

The ballistic panels of the invention may incorporate a single monolithic ceramic plate, or may comprise small tiles or ceramic balls suspended in flexible resin, such as polyurethane. Suitable resins are well known in the art. Additionally, multiple layers or rows of tiles may be attached to the plates of the invention. For example, multiple 3"×3"×0.1" (7.62 cm×7.62 cm×0.254 cm) ceramic tiles may be mounted on a 12"×12" (30.48 cm×30.48 cm) panel using a thin polyurethane adhesive film, preferably with all ceramic tiles being lined up with such that no gap is present between tiles. A second row of tiles may then be attached to the first row of ceramic, with an offset so that joints are scattered. This continues all the way down to cover the entire armor. For high performance at the lowest weight, it is preferred that panels are molded before attaching a rigid plate. However, for large panels, e.g. 4'×6' (1.219 m×1.829 m) or 4'×8' (1.219 m×2.438 m), a panel may be molded in a single, low pressure autoclave process together with a rigid plate.

The multi-panel structures of the invention may be used in various applications to form a variety of different ballistic resistant articles using well known techniques. For example, suitable techniques for forming ballistic resistant articles are described in, for example, U.S. Pat. Nos. 4,623,574, 4,650,710, 4,748,064, 5,552,208, 5,587,230, 6,642,159, 6,841,492 and 6,846,758.

The multi-panel structures are particularly useful for the formation of flexible, soft armor articles, including garments such as vests, pants, hats, or other articles of clothing, and covers or blankets, used by military personnel to defeat a number of ballistic threats, such as 9 mm full metal jacket (FMJ) bullets and a variety of fragments generated due to explosion of hand-grenades, artillery shells, Improvised Explosive Devices (IED) and other such devises encountered in military and peace keeping missions. As used herein, "soft" or "flexible" armor is armor that does not retain its shape when subjected to a significant amount of stress and is incapable of being free-standing without collapsing. The multi-panel structures are also useful for the formation of rigid, hard armor articles. By "hard" armor is meant an article, such as helmets, panels for military vehicles, or protective shields, which have sufficient mechanical strength so that it maintains structural rigidity when subjected to a significant amount of stress and is capable of being freestanding without collapsing. The structures can be cut into a plurality of discrete sheets and stacked for formation into an article or they can be formed into a precursor which is subsequently used to form an article. Such techniques are well known in the art.

Garments of the invention may be formed through methods conventionally known in the art. Preferably, a garment may be formed by adjoining the ballistic resistant articles of the invention with an article of clothing. For example, a vest may comprise a generic fabric vest that is adjoined with the ballistic resistant structures of the invention, whereby the inventive articles are inserted into strategically placed pockets. For best soft armor results, the panels having the least amount of polymeric composition should be positioned closest to a potential ballistic threat and the panels having the greatest amount of the polymeric composition should be positioned furthest from the potential ballistic threat. For best hard armor results, the panels having the greatest quantity of the polymeric composition should be positioned closest to a potential ballistic threat, and the panels having the least amount of polymeric composition should be positioned furthest from a potential ballistic threat. This allows for the maximization of ballistic protection, while minimizing the weight of the vest. As used herein, the terms "adjoining" or "adjoined" are intended to include attaching, such as by sewing or adhering and the like, as well as un-attached coupling or juxtaposition with another fabric, such that the ballistic resistant articles may optionally be easily removable from the vest or other article of clothing. Articles used in forming flexible structures like flexible sheets, vests and other garments are preferably formed from using a low tensile modulus polymeric matrix composition. Hard articles like helmets and armor are preferably formed using a high tensile modulus polymeric matrix composition.

The ballistic resistance properties are determined using standard testing procedures that are well known in the art. Particularly, the protective power or penetration resistance of a structure is normally expressed by citing the impacting velocity at which 50% of the projectiles penetrate the composite while 50% are stopped by the shield, also known as the $V_{50}$ value. As used herein, the "penetration resistance" of an article is the resistance to penetration by a designated threat, such as physical objects including bullets, fragments, shrapnel and the like, and non-physical objects, such as a blast from explosion. For composites of equal areal density, which is the weight of the composite panel divided by the surface area, the higher the $V_{50}$, the better the resistance of the composite. The ballistic resistant properties of the articles of the invention will vary depending on many factors, particularly the type of fibers used to manufacture the fabrics.

Flexible ballistic armor formed herein preferably have a $V_{50}$ of at least about 1920 feet/second (fps) (585.6 m/sec) when impacted with a 16 grain projectile. Flexible ballistic armor formed herein preferably have a $V_{50}$ of at least about 1400 feet/second (fps) (427 m/sec) when impacted with a 17 grain fragment simulated projectile (fsp).

The following non-limiting examples serve to illustrate the invention.

Example 1

Two continuous rolls of unidirectional fiber prepregs (unitapes) were prepared from SPECTRA® fibers. The unitapes contained 18 wt. % of a polymeric matrix composition consisting of KRATON® D1107 styrene-isoprene-styrene block copolymer elastomer. The rolls were placed on the cross-plying machine described in U.S. Pat. No. 5,173,138. The prepregs were cross-plied at 0°/90° and consolidated under heat and pressure to create a continuous two-ply structure. The continuous roll was further laminated between two 0.35 mil (0.0089 mm) thick LLDPE films using heat and pressure, forming a laminated continuous roll (LCR). The material from this roll is designated as Material A in Table 1 (SR-3111 SPECTRA® Shield product).

Twenty five two-ply pieces measuring 45.72 cm×45.72 cm were cut from the Material A LCR laminates and stacked in an array without molding or otherwise interconnecting the pieces together. The article so formed was subjected to ballistic testing against a 9 MM Full Metal Jacket (FMJ) bullet (8.04 g weight) according to NIJ Standard 0101.04 Revision A. Results of the ballistic testing are shown in Table 1.

Example 2

In addition to the LCR in Example 1 with 18% polymeric matrix composition content, another LCR was manufactured with 11 wt % of a polymeric matrix composition consisting of KRATON® D1107 styrene-isoprene-styrene block copolymer elastomer. The material from this roll is designated as Material B in Table 1 (SR-3121 SPECTRA® Shield product).

Fourteen two-ply pieces measuring 45.72 cm×45.72 cm were cut from Material B and thirteen two-ply pieces measuring 45.72 cm×45.72 cm were cut from Material A. All twenty seven pieces from Material B and Material A were stacked together in a single array without molding or otherwise interconnecting the pieces together. The article so formed was subjected to ballistic testing against a 9 MM FMJ bullet (124 grain, 8.04 g weight) according to NIJ Standard 0101.04 Revision A where Material B faced the bullet. Results of the ballistic testing are shown in Table 1. As listed in the Tables below, Material 1 is the panel positioned to be struck first by a ballistic threat; Material 2 is the panel positioned to be struck second by the ballistic threat.

Example 3

Similar to Example 2, fourteen two-ply pieces measuring 45.72 cm×45.72 cm were cut from Material A and thirteen two-ply pieces measuring 45.72 cm×45.72 cm were cut from Material B. All twenty seven pieces from Material A and Material B were stacked together in a single array without molding or otherwise interconnecting the pieces together. The article so formed was subjected to ballistic testing against a 9 MM FMJ bullet (8.04 g weight) according to NIJ Standard 0101.04 Revision A with Material A positioned to be struck first by the ballistic threat. Results of the ballistic testing are shown in Table 1.

Example 4

Example 2 was duplicated with another set of two-ply pieces cut from Materials B and A (45.72 cm×45.72 cm sample size). Results of the ballistic testing are shown in Table 1.

Example 5

Example 3 was duplicated with another set of two-ply pieces cut from Materials A and B (45.72 cm×45.72 cm sample size). Results of the ballistic testing are shown in Table 1.

Example 6

Twenty-eight two-ply pieces measuring 45.72 cm×45.72 cm were cut from Material B and stacked in an array without molding or otherwise interconnecting the pieces together. The article so formed was subjected to ballistic testing according to NIJ Standard 0101.04 Revision A. Results of the ballistic testing are shown in Table 1. Additional layers were included compared to Example 1 to account for the difference in matrix quantity while maintaining the same areal density.

TABLE 1

| Example | Material 1 | Material 2 | Total Areal Density (kg/m²) | 9 MM FMJ $V_{50}$ (m/sec) | Backface Deformation (mm) |
|---|---|---|---|---|---|
| 1 | A, 25 two-ply pieces | None | 3.76 | 450 | 36 |
| 2 | B, 14 two-ply pieces | A, 13 two-ply pieces | 3.76 | 495 | 38 |
| 3 | A, 14 two-ply pieces | B, 13 two-ply pieces | 3.76 | 480 | 39 |
| 4 | B, 14 two-ply pieces | A, 13 two-ply pieces | 3.76 | 497 | 40 |
| 5 | A, 14 two-ply pieces | B, 13 two-ply pieces | 3.76 | 487 | 39 |
| 6 | None | B, 28 two-ply pieces | 3.76 | 495 | 44 |

The ballistic fragment performance of soft armor summarized in Examples 1 to 6 in Table 1 show that:
1. Varying the quantity of polymeric matrix composition within a single shoot pack (or flexible vest) increases the ballistic resistance against a 9 MM FMJ ballistic threat.
2. Backface deformation on clay is lower in a shoot pack with multiple panels having varying polymeric matrix composition quantities compared to all low resin ballistic material when tested against a 9 MM FMJ ballistic threat.
3. For best soft armor results, the panels having the least amount of polymeric composition should be positioned closest to a potential ballistic threat and the panels having the greatest amount of the polymeric composition should be positioned furthest from the potential ballistic threat.

Example 7

Two two-ply continuous pre-consolidated rolls (PCRs) were made similar to those shown in Examples 1 and 2, but without adding LLDPE film. The two PCRs have 20% (referred as Material C in Table 2) and 11% (referred as Material D in Table 2) KRATON® D1107 styrene-isoprene-styrene block copolymer elastomer as the polymeric matrix composition. As listed in the Tables below, Material 1 is the panel positioned to be struck first by a ballistic threat; Material 2 is the panel positioned to be struck second by the ballistic threat.

Thirty-seven two-ply pieces measuring 30.48 cm×30.48 cm were cut from Material C, stacked in an array and were molded in a match-die mold, first by pre-heating the stacked pieces for 10 minutes at 120° C., followed by applying 35 bars molding pressure for 10 minutes, thereby forming a molded panel. Each two-ply piece had a 0°/90° fiber orientation. The molded panel was subjected to ballistic testing according to US Military standard MIL-STD-662F, using a .22 caliber fragment simulating projectile weighing 17 grain and following MIL-P-46593A (ORD). The $V_{50}$ results of the ballistic testing are shown in Table 2.

Example 8

Twenty two-ply pieces measuring 30.48 cm×30.48 cm were cut from Material D and nineteen two-ply pieces were cut from Material C. The two-ply pieces of Material D and Material C were stacked together in a single array and molded in a match-die mold, first by pre-heating the stacked pieces for 10 minutes at 120° C., followed by applying 35 bars molding pressure for 10 minutes, thereby forming a molded panel. Each two-ply piece had a 0°/90° fiber orientation. The molded panel was subjected to ballistic testing according to US Military standard MIL-STD-662F, using a .22 caliber fragment simulating projectile weighing 17 grain and following MILL-P-46593A (ORD). The $V_{50}$ results of the ballistic testing are shown in Table 2. The Material D side was facing the incoming fragment during testing.

Example 9

Nineteen two-ply pieces measuring 30.48 cm×30.48 cm were cut from Material C and twenty two-ply pieces were cut from Material D. The two-ply pieces of Material C and Material D were stacked together in a single array and molded in a match-die mold, first by preheating the stacked pieces for 10 minutes at 120 C, followed by applying 35 bars molding pressure for 10 minutes, thereby forming a molded panel. Each two-ply piece had a 0°/90° fiber orientation. The molded panel was subjected to ballistic testing according to US Military standard MIL-STD-662F, using a .22 caliber fragment simulating projectile weighing 17 grain and following MILL-P-46593A (ORD). The $V_{50}$ results of the ballistic testing are shown in Table 2. The Material C side was facing the incoming fragment during testing.

Example 10

Example 8 was duplicated with another molded panel with another set of pieces of Material D and Material C. The Material D side was facing the incoming fragment during testing. The $V_{50}$ results of the ballistic testing are shown in Table 2.

Example 11

Example 9 was duplicated with another molded panel with another set of pieces of Material C and Material D. Material C side was facing the incoming fragment during testing. The $V_{50}$ results of the ballistic testing are shown in Table 2, Example 11.

Example 12

Forty-two two-ply pieces measuring 30.48 cm×30.48 cm were cut from Material D, stacked in an array and were molded in a match-die mold, first by preheating the stacked pieces for 10 minutes at 120° C., followed by applying 35 bars molding pressure for 10 minutes, thereby forming a molded panel. Each two-ply piece had a 0°/90° fiber orientation. The molded panel was subjected to ballistic testing according to US Military standard MIL-STD-662F, using a .22 caliber fragment simulating projectile weighing 17 grain and following MIL-P-46593A (ORD). The $V_{50}$ results of the ballistic testing are shown in Table 2. Additional layers were included compared to Example 7 to account for the difference in matrix quantity while maintaining the same areal density.

TABLE 2

| Example | Material 1 | Material 2 | Total Areal density (kg/m$^2$) | 17 grain FSP V$_{50}$ (m/sec) |
|---|---|---|---|---|
| 7 | C, 37 two-ply pieces | None | 4.97 | 546 |
| 8 | D, 20 two-ply pieces | C, 19 two-ply pieces | 4.88 | 562 |
| 9 | C, 19 two-ply pieces | D, 20 two-ply pieces | 4.97 | 577 |
| 10 | D, 20 two-ply pieces | C, 19 two-ply pieces | 4.93 | 569 |
| 11 | C, 19 two-ply pieces | D, 20 two-ply pieces | 4.97 | 572 |
| 12 | None | D, 42 two-ply pieces | 4.97 | 571 |

The ballistic fragment performance of hard armor summarized in Examples 7 to 12 in Table 2 confirm that by changing polymeric matrix composition content in a single molded panel (made with identical fiber type) increases the ballistic resistance against a .22 caliber, 17 grain fragment simulating projectile. Particularly, Table 2 shows that by positioning a 20% resin content panel as the front panel of the article structure, the ballistic resistance is greater than when it is placed as the rear panel of the structure. For best hard armor results, the panels having the greatest amount of polymeric composition should be positioned closest to a potential ballistic threat and the panels having the least amount of the polymeric composition should be positioned furthest from the potential ballistic threat.

Example 13

Two continuous pre-consolidated rolls (PCR) were made similar to shown in Example 7. The two PCRs have 20% (referred as Material C in Table 3) and 11% (referred as Material D in Table 3) KRATON® D1107 styrene-isoprene-styrene block copolymer elastomer, like Examples 7-12.

One hundred and twenty seven two-ply pieces measuring 30.48 cm×30.48 cm were cut from Material C, stacked in an array and were molded in a match-die mold, first by preheating the stacked pieces for 25 minutes at 120° C., followed by applying 35 bars molding pressure for 10 minutes, thereby forming a molded panel. Each two-ply piece had a 0°/90° fiber orientation. The molded panel was subjected to ballistic testing according to US Military standard MIL-STD-662F, using a high power rifle US military M80 ball bullet (weight: 9.65 g). Two identical molded panels were tested to calculate the V$_{50}$. The V$_{50}$ results of the ballistic testing are shown in Table 3.

Example 14

Sixty-eight two-ply pieces measuring 30.48 cm×30.48 cm were cut from Material D and sixty-eight two-ply pieces were cut from Material C. The two-ply pieces of Material D and Material C were stacked together in a single array and molded in a match-die mold, first by preheating the stacked pieces for 25 minutes at 120° C., followed by applying 35 bars molding pressure for 10 minutes, thereby forming a molded panel. Each two-ply piece had a 0°/90° fiber orientation. The molded panel was subjected to ballistic testing according to US Military standard MIL-STD-662F, using a high power rifle US military M80 ball bullet (weight: 9.65 g). The Material D side was facing the incoming M80 ball bullet during testing. Two identical molded panels were tested to calculate the V$_{50}$. The V$_{50}$ results of the ballistic testing are shown in Table 3.

Example 15

Sixty-eight two-ply pieces measuring 30.48 cm×30.48 cm were cut from Material C and sixty-eight two-ply pieces were cut from Material D. The two-ply pieces of Material C and Material D were stacked together in a single array and molded in a match-die mold, first by preheating the stacked pieces for 25 minutes at 120 C, followed by applying 35 bars molding pressure for 10 minutes, thereby forming a molded panel. Each two-ply piece had a 0°/90° fiber orientation. The molded panel was subjected to ballistic testing according to US Military standard MIL-STD-662F, using a high power rifle US military M80 ball bullet (weight: 9.65 g). The Material C side was facing the incoming M80 ball bullet during testing. Two identical molded panels were tested to calculate the V$_{50}$. The V$_{50}$ results of the ballistic testing are shown in Table 3.

Example 16

One hundred and forty five two-ply pieces measuring 30.48 cm×30.48 cm were cut from Material D, stacked in an array and were molded in a match-die mold, first by preheating the stacked pieces for 25 minutes at 120° C., followed by applying 35 bars molding pressure for 10 minutes, thereby forming a molded panel Each two-ply piece had a 0°/90° fiber orientation. The molded panel was subjected to ballistic testing according to US Military standard MIL-STD-662F, using a high power rifle US military M80 ball bullet (147 grain; weight: 9.525 g). Two identical molded panels were tested to calculate the V$_{50}$. The V$_{50}$ results of the ballistic testing are shown in Table 3. Additional layers were included compared to Example 13 to account for the difference in matrix quantity while maintaining relatively the same areal density.

TABLE 3

| Example | Material 1 | Material 2 | Total Areal density (kg/m$^2$) | M80 ball V$_{50}$ (m/sec) |
|---|---|---|---|---|
| 13 | C, 127 two-ply pieces | None | 17.03 | 785 |
| 14 | D, 68 two-ply pieces | C, 68 two-ply pieces | 17.32 | 797 |
| 15 | C, 68 two-ply pieces | D, 68 two-ply pieces | 17.14 | 844 |
| 16 | None | D, 145 two-ply pieces | 17.13 | 820 |

The ballistic fragment performance of hard armor summarized in Examples 13 to 16 in Table 3 confirm that by changing polymeric matrix composition content the resistance against a rifle bullet also increases. For best hard armor results the panels having the greatest amount of polymeric composition should be positioned closest to a potential ballistic threat and the panels having the least amount of the polymeric composition should be positioned furthest from the potential ballistic threat.

In summary, Examples 1 to 16 show that the ballistic performance of a composite increases by varying the polymeric matrix composition content within the same ballistic flexible shoot pack or molded panels against fragments and high energy rifle bullets.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A ballistic resistant article formed from a ballistic resistant material, the ballistic resistant material comprising:
    a) a first panel comprising a plurality of fibrous layers, said plurality of fibrous layers being consolidated; each of the fibrous layers comprising a plurality of fibers, said fibers having a tenacity of 7 g/denier or more and a tensile modulus of 150 g/denier or more; each of said fibers having a surface, and the surfaces of said fibers being coated with a polymeric composition; and
    b) a second panel attached to the first panel, which second panel is different than the first panel, and which second panel comprises a plurality of fibrous layers, said plurality of fibrous layers being consolidated; each of the fibrous layers comprising a plurality of fibers, said fibers having a tenacity of 7 g/denier or more and a tensile modulus of 150 g/denier or more; each of said fibers having a surface, and the surfaces of said fibers being coated with a polymeric composition; and
    c) said first panel containing a greater percentage by weight of the polymeric composition in the first panel, based on the total weight of the first panel, than a percentage by weight of the polymeric composition in said second panel, based on the total weight of the second panel; and
    d) at least one additional panel attached to the first panel, to the second panel, or to both the first panel and to the second panel, the at least one additional panel comprising a plurality of fibrous layers, said plurality of fibrous layers being consolidated; each of the fibrous layers comprising a plurality of fibers, said fibers having a tenacity of 7 g/denier or more and a tensile modulus of 150 g/denier or more; each of said fibers having a surface, the surfaces of said fibers being coated with a polymeric composition,
    and wherein the said second panel contains a greater percentage by weight of the polymeric composition, based on the total weight of the second panel, than a percentage by weight of the polymeric composition in said at least one additional panel, based on the total weight of the at least one additional panel.

2. A ballistic resistant material comprising, in order:
    a) a first panel comprising a plurality of fibrous layers, said plurality of fibrous layers being consolidated; each of the fibrous layers comprising a plurality of fibers, said fibers having a tenacity of 7 g/denier or more and a tensile modulus of 150 g/denier or more; each of said fibers having a surface, and the surfaces of said fibers being coated with a polymeric composition; and
    b) a second panel attached to the first panel, which second panel is different than the first panel, and which second panel comprises a plurality of fibrous layers, said plurality of fibrous layers being consolidated; each of the fibrous layers comprising a plurality of fibers, said fibers having a tenacity of 7 g/denier or more and a tensile modulus of 150 g/denier or more; each of said fibers having a surface, and the surfaces of said fibers being coated with a polymeric composition;
    c) said first panel containing a greater percentage by weight of the polymeric composition in the first panel, based on the total weight of the first panel, than a percentage by weight of the polymeric composition in said second panel, based on the total weight of the second panel; and
    d) one or more additional panels attached to said second panel, wherein at least one of said additional panels is formed from fibers that are not coated with a polymeric composition; wherein said one or more additional panels comprises a plurality of fibers having a tenacity of 7 g/denier or more and a tensile modulus of 150 g/denier or more; wherein all of the panels are interconnected to form a series of interconnected ballistic resistant panels, and wherein each consecutive panel in the series contains a lower percentage by weight of the polymeric composition than the previous panel in the series to which it is connected, based on the total weight of each panel.

3. A ballistic resistant article formed from a ballistic resistant material, the ballistic resistant material comprising:
    a) a first panel comprising a plurality of fibrous layers, said plurality of fibrous layers being consolidated; each of the fibrous layers comprising a plurality of fibers, said fibers having a tenacity of 7 g/denier or more and a tensile modulus of 150 g/denier or more; each of said fibers having a surface, and the surfaces of said fibers being coated with a polymeric composition; and
    b) a second panel attached to the first panel, which second panel is different than the first panel, and which second panel comprises a plurality of fibrous layers, said plurality of fibrous layers being consolidated; each of the fibrous layers comprising a plurality of fibers, said fibers having a tenacity of 7 g/denier or more and a tensile modulus of 150 g/denier or more; each of said fibers having a surface, and the surfaces of said fibers being coated with a polymeric composition; and
    c) said first panel containing a greater percentage by weight of the polymeric composition in the first panel, based on the total weight of the first panel, than a percentage by weight of the polymeric composition in said second panel, based on the total weight of the second panel; and
    d) at least one additional panel attached to the first panel, to the second panel, or to both the first panel and to the second panel, the at least one additional panel comprising a plurality of fibrous layers, said plurality of fibrous layers being consolidated; each of the fibrous layers comprising a plurality of fibers, said fibers having a tenacity of 7 g/denier or more and a tensile modulus of 150 g/denier or more; each of said fibers having a surface, and the surfaces of said fibers optionally being coated with a polymeric composition, and wherein the article comprises:
    a) a series of four interconnected panels, the panels having respective polymeric composition quantities, in order, of 20%, 15%, 10% and 7% by weight of the combined weight of its fibers and polymeric composition; or
    b) a series of three interconnected panels, the panels having respective polymeric composition quantities, in order, of 20%, 10% and 0% by weight of the combined weight of its fibers and polymeric composition.

* * * * *

UNITED STATES PATENT AND TRADEMARK OFFICE
CERTIFICATE OF CORRECTION

PATENT NO.       : 7,622,405 B1                                      Page 1 of 1
APPLICATION NO.  : 11/527924
DATED            : November 24, 2009
INVENTOR(S)      : Arvidson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 243 days.

Signed and Sealed this

Twenty-sixth Day of October, 2010

David J. Kappos
*Director of the United States Patent and Trademark Office*